United States Patent [19]
Lind et al.

[11] 4,225,815
[45] Sep. 30, 1980

[54] METHOD AND APPARATUS FOR THE CHARGING AND SUPERVISION OF A BATTERY

[75] Inventors: Hans S. H. Lind; Sune A. W. Örevik, both of Huddinge, Sweden

[73] Assignee: Telefonaktiebolaget L M Ericsson, Stockholm, Sweden

[21] Appl. No.: 874,121

[22] Filed: Feb. 1, 1978

[30] Foreign Application Priority Data

Feb. 17, 1977 [SE] Sweden ............................. 7701792

[51] Int. Cl.² ................................................ H02J 7/04
[52] U.S. Cl. ....................................... 320/39; 320/20
[58] Field of Search ..................... 320/20, 21, 31, 39, 320/40

[56] References Cited

U.S. PATENT DOCUMENTS

| 3,289,065 | 11/1966 | Dehmelt et al. ....................... 320/40 |
| 3,835,362 | 9/1974 | Greene ............................... 320/31 X |
| 3,889,172 | 6/1975 | Leladier et al. ..................... 320/31 X |

*Primary Examiner*—Robert J. Hickey
*Attorney, Agent, or Firm*—Hane, Roberts, Spiecens & Cohen

[57] ABSTRACT

Method and apparatus for the charging a battery which as a stand-by supply is connected to the output of a controllable rectifier supplying a load measures the charging current from the rectifier to the battery at certain instants in order to obtain the change of the charging current, the current value at each measuring instant being stored and, after that, the value being compared with the value of any of the previous measuring instants. The result of this comparison is used as a control condition for a controllable rectifier in order to determine the output voltage from the rectifier.

5 Claims, 6 Drawing Figures

METHOD AND APPARATUS FOR THE CHARGING AND SUPERVISION OF A BATTERY

BACKGROUND OF THE INVENTION

The present invention relates to a method and apparatus for the automatic charging and supervision of an accumulator battery which, as a source of stand-by voltage is connected to the outlet of a controllable rectifier arrangement that feeds a subsequent load, e.g. a telephone exchange.

Accumulator batteries are practically always present in current supply systems for such tele-communication equipments which demand a high degree of safety and uninterrupted DC-supply. In present systems, the battery is normally fully charged and does not participate in the delivery of energy to the tele-communication equipment except for short duration transient loads.

The task of the battery is to supply the tele-communication equipment during a voltage break down with necessary energy without interruption and during the time of the break down or until a possible stand-by element has started. Electronic devices in tele-communication equipments do not allow high values on transient voltages. The battery, which has very low impedance then proves itself to be an economical as well as an appropriate means to reduce such transients. The low impedance of the battery is also employed as to suppress disturbing voltages from rectifiers or other disturbing devices in tele-communication equipments in order to reduce crosstalk.

As mentioned above and to keep the battery fully charged, a charging device is required which charges the battery to full charge with no risk of overcharge and which is independent of such battery parameters as temperature and age.

In order to keep the battery fully charged when simultaneously supplying the tele-communication equipment with necessary current, it is necessary to adapt the outlet voltage to the battery type and to the number of series connected cells. The lead-battery, which is the most common battery type, requires a voltage of 2.15–2.25 V/cell. The battery manufacturer usually prescribes a value between these limits, e.g. 2.22 V. This value should be contained with an accuracy of $\pm 0.5\% - \pm 1\%$ so that the best operation condition for the battery will be guaranteed and thereby obtain a long lifetime.

When charging the battery, it is of importance that 100% charging degree can be achieved, since there is a risk of sulphation of uncharged elements in the battery-cells for insufficient charge of the battery, whereas for excess charge there is a risk for an accelerated corrosion, increased water consumption and, in unfavorable cases, such a high and rapid rise in temperature that the battery is destroyed.

One example of a previously known charging method consists in measuring the period of discharge and, after that, charging the battery for a period which is dependent on the period of the discharge. This method is not sufficiently accurate for obtaining 100% charging degree, since no attention is paid to the number of discharged ampere hours or to the power loss that may vary.

Another known method consists in measuring the number of discharged ampere hours and, after that, charging the battery with an equivalent number of ampere hours. Also this method is not sufficiently accurate since, like the first mentioned method, it pays no attention to the battery losses.

Still another known method is based upon measurement of the charging current which is delivered to a battery at a determined cell voltage. At a cell voltage of, e.g. 2.35 V/cell, the battery is fully charged if the charging current is less than 4 mA/Ah and the charging can be interrupted. The drawback with this method is, however, that the final value of the charging current is dependent on the temperature and age of the battery.

SUMMARY OF THE INVENTION

The present invention is based upon the observation when charging of batteries that the charging current is decreased successively as long as the battery is undercharged, while when the battery has achieved 100% charging degree and just before the same is overcharged, the charging current is leveled to a final value which is mainly constant in time. Accordingly, by indicating the change of the charging current as a function of time, 100% charging degree can be interrupted at the correct instant.

Practical use of this physical principle implies, however, great difficulties regarding the techniques of measurement. The change of the charging current in time at the final stage of the charging is extremely low, e.g. 0.1 mA per hour. This implies that current values must be measured with sufficient accuracy and these measured values must be stored for comparison during sufficiently long time intervals in order to determine the change of the current in time with sufficient accuracy.

One object of the present invention is to provide a method and an apparatus for the automatic charge of one or several batteries by means of which 100% charging rate can be attained without risk for under- or overloading disregarding such battery parameters as temperature and age.

BRIEF DESCRIPTION OF THE DRAWING

The invention, the characteristics of which appear from the appended claims will be more fully described with reference to the accompanying drawing. In the drawing;

DESCRIPTION OF THE PREFERRED EMBODIMENT OF THE INVENTION

Figure 1:
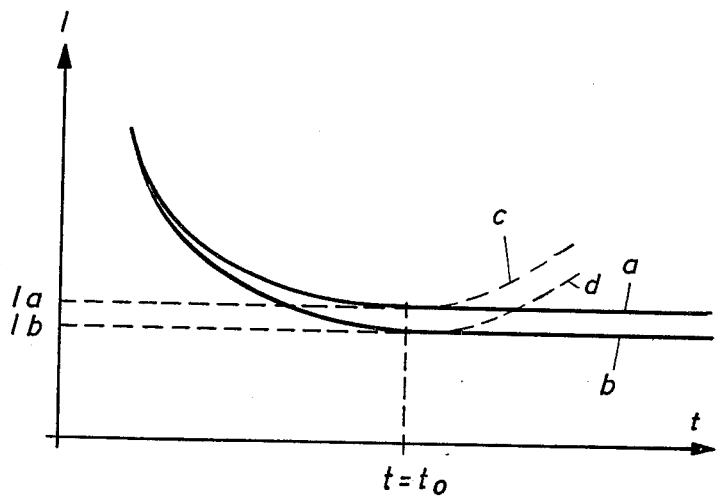
FIG. 1 shows a diagram to illustrate the above-mentioned property of a leveling charging current on which the inventive method is based.

In the diagram according to FIG. 1, the charge characteristic is illustrated for two accumulator batteries (curve a and curve b, respectively) which batteries initially are discharged, but which are charged by a certain current I, while the voltage across each battery is constant. For t<to, the charging current drops towards a certain final value for each battery. At t=to, each battery has obtained 100% charging degree, implying that the internal emf of the battery will not continue to increase. This in turn implies that the charging current has leveled off to its final value Ia and Ib for each battery, respectively. The final value of the charging current is characteristic for a certain battery and is strongly dependent on the age and temperature of the battery, but the leveled-off characteristic is universal. By indicating when $\Delta I/\Delta t = 0$, a physically correct instant is obtained when a battery has attained 100% charging degree disregarding age and temperature. The dashed curves c and d illustrate in the diagram for each charge characteristic, respectively a possibly abnormal process of the charging current depending on, e.g. a continuous increase of the battery-acid temperature.

Figure 2:
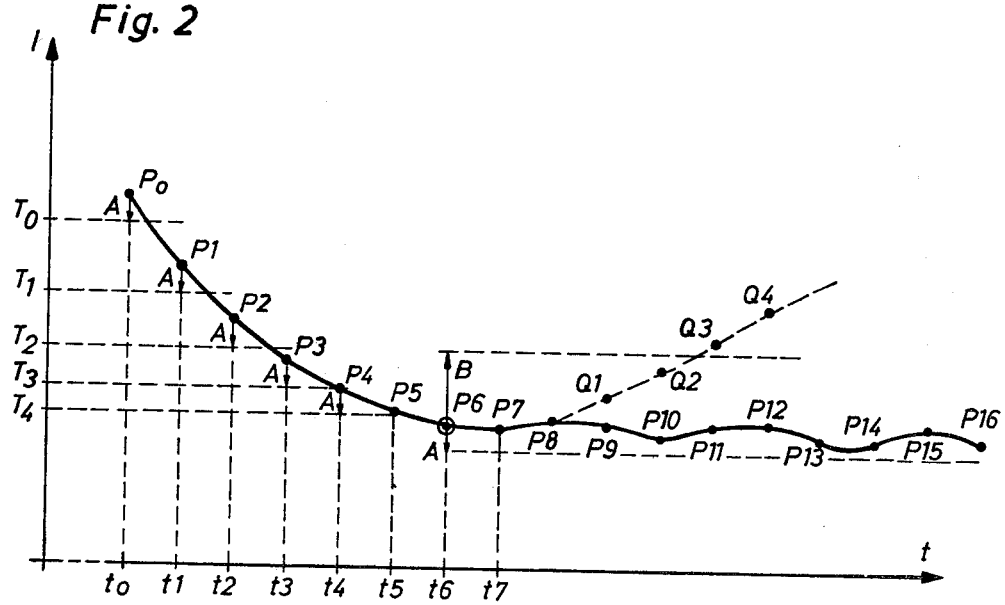
FIG. 2 shows an enlarged part of the diagram according to FIG. 1 within the area in which the charging current starts to level off in order to explain the method according to the invention.

The method according to the invention will be more fully described with reference to FIG. 2. As will be more closely described in relation to FIG. 3, the battery which is charged is connected to a mains-connected controllable rectifier which, in addition to supplying a tele-communication equipment, also supplies the battery with charging current. Furthermore, a measuring circuit is included for measuring this current. At the time to according to FIG. 2, measuring of the current in the measuring point Po is carried out and a current value I(to) is obtained which is stored in a reference value memory preferably in digital form. At the same time t1 a new measurement of the charging current in the measuring point P1 is carried out and a value I(t1) is obtained and stored in an auxiliary memory. The values I(to) and I(t1) are compared with each other by forming the difference $\Delta I1 = I(to) - I(t1)$ in a difference forming circuit. If $\Delta I < A$, where A is a constant value during the entire measuring process, the value I(to) in the reference value memory is erased and the value I(t1) is stored in this memory, the auxiliary memory being ready to store a new value. At the next measuring point P2, the value I(t2) is obtained which is stored in the auxiliary memory and the difference $\Delta I2 = I(t1) - I(t2)$ is formed. If $\Delta I2 > A$ the same process as mentioned above will occur, e.g., an erasing of the value I(t1) in the reference value memory and the value I(t2) is stored in this memory. Accordingly, FIG. 2 illustrates that, if a measured value of the charging current falls below the preceding value with a certain margin, this preceding value is rejected as a reference value and the latest measured value is stored and used as a reference value at the next comparison.

At the time t5, the value $\Delta I(t5)$ is measured at the measuring point P5 which, as has been described above, is compared with the value I(t4) the measuring point P4 by forming the difference $I5 = I(t5)$. Since the value I(t5) is situated above the threshold T4, $\Delta I5 < A$. The value I(t4) is consequently not erased from the reference value memory. Instead, the value I(t5) is erased in the auxiliary memory and the value I(t4) is maintained as a reference value in the reference value memory at the next measuring instant. At this instant (measuring point P6), again $\Delta I6 = I(t4) - T(t6) > A$ is valid. Therefore, the value I(t4) is erased in the reference value memory and the value I(t6) is stored in this memory. At the succeeding measuring instants (measuring points P7, P8, ... P16), the difference between the presently valid reference value I(t6) and the subsequent values I(tk) (k = 7, 8, ... 16) are assumed to be less than the constant value A, that is $/\Delta \Delta Ik/ = /I(t6) - I(tk)/ < A$, k = 7, 8 .. . 16.

This condition for a leveling-off current is always valid in the case $\Delta Ik > 0$ (decreasing current). In the case that the current has increased in any of the measuring points after the point P6, i.e. $\Delta Ik < 0$ (k = 7, 8, ... 16), it is not necessary that $/\Delta Ik/ < A$, $\Delta Ik < 0$. Instead, a difference value greater than the value A can be permitted, e.g. the value B according to FIG. 2. Accordingly, a plaining-off current exists even if $/\Delta Ik/ < B$, $\Delta Ik < 0$ (measuring points Q1 and Q2).

The value I(t6) in the measuring point P6 thus remains as reference value in all the remaining points. By adding up the result of a number of measuring points P7, P8, ... P16 or P7, P8, Q1, Q2 for which is valid that $/\Delta Ik/ < A$ if $Ik > 0$ and $/\Delta Ik/ < B$ if $Ik < 0$, k = 7, 8, ... 16 respectively, a criterium for a plaining-off current can be indicated. The number can be arbitrary, e.g. 10 for the measuring points P7–P16. After 10 of those values, 100% charging degree has been attained and a control condition for the controllable rectifier is obtained for alteration of the charging voltage from, e.g. 2.35 V/cell to 2.22 V/cell (maintenance charge).

The dashed curve including the measuring points Q1–Q4 indicates the abnormal state of charge (Cf. curves c and d in FIG. 1). In this case, like before, the difference is formed between the measuring value in point P6 and the measuring value Q1. If the difference is less than the prescribed constant value B, the measuring value in point P6 is maintained, and measuring is after that carried out in point Q2, the difference between the measuring value in points P6 and Q3 being formed which still is less than the value B. At the next measurement is, as it appears from FIG. 2, the difference between the measuring values in the points P6 and Q3 greater than B, for which reason a control condition $/Ik/ > B$ has been fulfilled in two consecutive measuring points 2.22 V/cell (maintenance charge), cf. above.

The final reference value obtained in the measuring point P6 forms a measure of the final charging current of the battery. This stored value, i.e. I(t6) gives information about an appropriate charging voltage and temperature and can be used for determinating the operation condition of the battery. The value can also be used to determine a renewal charge of the battery. For instance, for intermittent discharges, the maintenance charging current will increase and when this current has raised to the stored value, that is, I(t6), the battery must be recharged in order to maintain a 100% charging degree.

Figure 3:
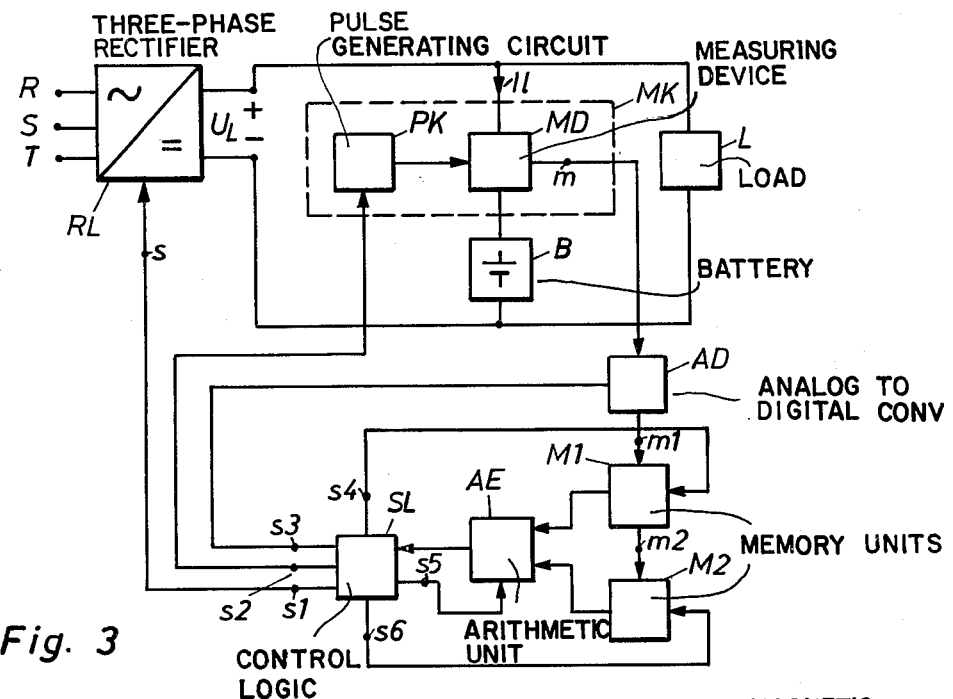
FIG. 3 shows a block diagram of a current supplying equipment utilizing to the invention.

In FIG. 3, a block diagram for a current supplying arrangement is shown comprising the apparatus according to the invention. A three phase rectifier RL is connected to an external mains network via the inlet terminals, R, S and T. The rectifier is, via a control inlet s, controllable in such a way that its rectified outlet voltage can assume two separate levels in dependence on the appearance of the control pulses. For instance, a high level control pulse can control the rectifier so that the outlet voltage will assume a high direct voltage level, whereas a low level control pulse will imply a low direct voltage level UL. An example of such a rectifier is illustrated in "Ericsson Review," No. 3, 1969, pp 85-87.

The outlet of the rectifier RL is connected to a load L, e.g. a telephone exchange for current supply of the same. Across the outlet of the rectifier RL with the load L, a current measuring circuit MK and, in series, the battery B is connected as an auxiliary aggregate. The current measuring circuit MK is connected for accurate measuring of the charging current I1 to the battery B and consists partly of a current pulse generating circuit PK and, partly of a current measuring device MD known per se. As will be more closely described in relation to FIG. 4, the known measuring device is supplemented by an extra bias winding which is fed by the current pulse circuit PK in order to enable measurement of currents within a certain measuring interval, e.g. 0–130 mA per Ah, with a possibility of detecting a change in the charging current of the order of magnitude 0.2 mA per Ah, which values are appropriate in battery charging systems where each battery cell requires a voltage of 2.15–2.35 V/cell, cf. above.

The voltage that appears accross the outlet terminal m of the measuring device MD represents an analog value of the charging current I1. This value is supplied to an analog-digital converter AD for conversion to a digital value with a certain number of bits, e.g. 12, in order to obtain a good resolution and thereby sufficient accuracy. The analog-digital converter AD forms before conversion the average value of the measured charging current during the time interval of measuring, by forming the voltage time integral in a known manner. The outlet of the analog-digital converter AD is connected to a first memory unit M1 through the inlet terminal m1 for storing the digital measuring value. The memory unit M1 is connected through the terminal m2 to a second memory unit M2 of the same kind as the memory unit M1 for storing a measuring value in digital form. The memory unit M1 corresponds to the "auxiliary memory" (mentioned by way of introduction), and the memory unit M2 corresponds to the "reference value memory." The outlets of the memory units M1 and M2 are connected to both inlets of an arithmetic unit AE in order to form the difference between the stored measuring values in the units M1 and M2, i.e., in order to form the quantity Ik=I(tk−n)−I(tk), where I(tk) is the value of the charging current at a certain measuring point, whereas I(tk−n) is the value of the same current at another measuring point, e.g. the next preceding (n=1) one. The outlet of the arithmetic unit AE is connected to an inlet of a control logic SL which across its outlets s1–s6 delivers control pulses in a certain time sequence, partly in order to activate the pulse generating circuit PK, the analog-digital converter AD, both memory units M1 and M2, and the arithmetic unit AE; and partly in order to generate the mentioned control pulse to the controllable rectifier for determination of the outlet voltage of the rectifier, as has been described in relation with FIG. 2.

Figure 4:
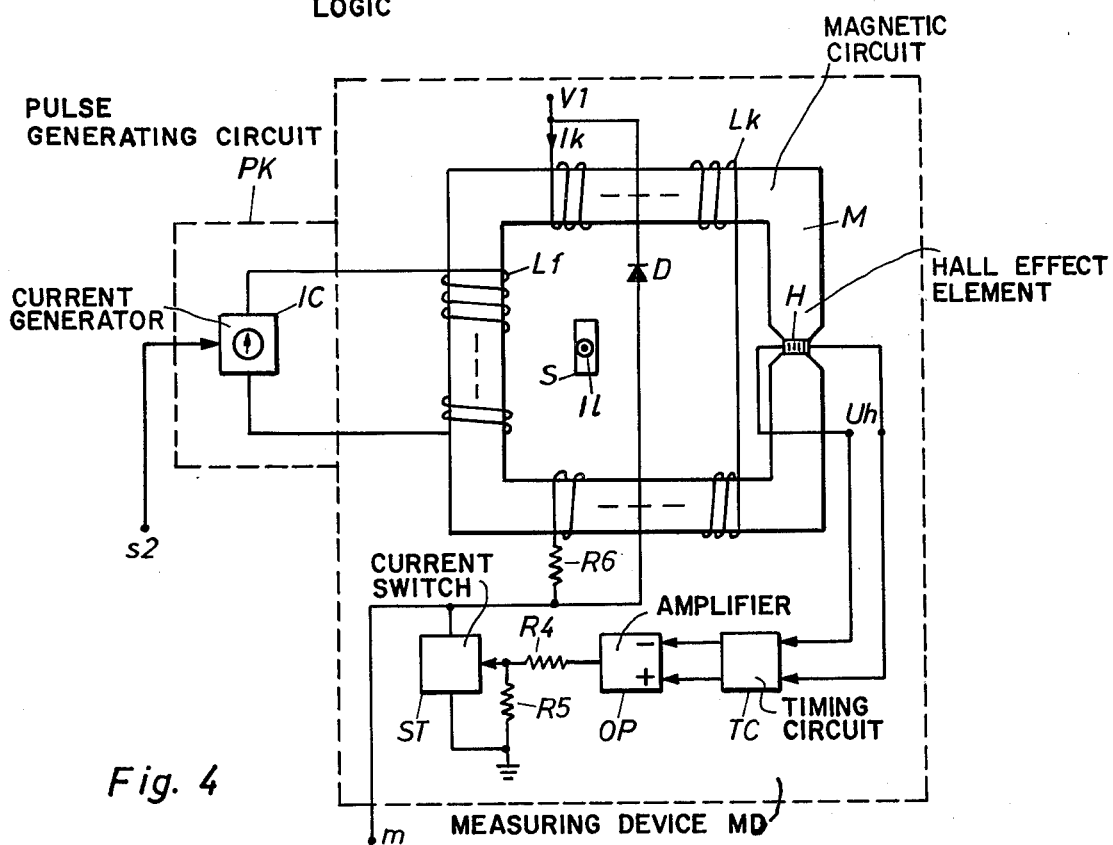
FIG. 4 shows a circuit diagram of a current generating circuit and a measuring device which are included in the block diagram according to FIG. 3.

The measuring principle of the current will now be described with reference to FIG. 3. The measuring circuit includes a pulse generating circuit PK and a measuring device MD. FIG. 4 has, as far as the measuring device is concerned, the same symbols as have been maintained in the above-mentioned patent application. The different parts comprised in the measuring device will here be mentioned in brief:

M = closed magnetic circuit

H = Hall element located in an air gap of the magnetic circuit

Lk = compensating winding, consisting of two inversely coupled coils in order to increase the inductance in the magnetic circuit M V1 = the potential of one pole of the voltage source for generation of the compensating current Ik OP = operational amplifier connected to the outlet of the Hall element R4, R5 = resistor link ST = current switch for closing and breaking the compensating current Ik R6 = measuring resistor for obtaining a voltage across the outlet terminal m proportional to the compensating current, e.g. the charging current D = freewheeling diode for bridging the compensating current Ik when the current switch ST is in a blocked state S = bus conducting the charging current I1

TC = timing circuit

The time constant of the timing circuit TC that is included in the known measuring device according to the above-mentioned patent application has here been reduced, wherby the current switch changes its state with a considerably higher frequency (=5 kHz). This frequency is so high that it will be possible for the measuring device MD to measure small charging currents (0.1 nA) through the bus S. A voltage current transformer in the known measuring device has, furthermore, been omitted and the measuring value is detected directly as a voltage value across the resistor R6.

A bias winding Lf is located on a leg of the magnetic circuit M. This winding is connected to a controllable current generator IC through a diode D1 included in the pulse generating circuit PK. The current generator IC is controlled by means of control pulses from the outlet s2 of the control logic SL according to FIG. 3.

Figure 5:
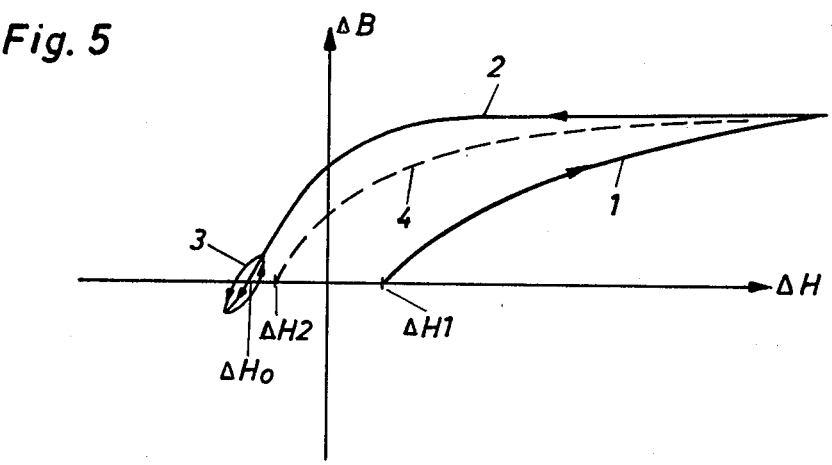
FIG. 5 shows a hysteresis diagram for explaining the measurement principle of the apparatus according to the invention.

The mode of operation of the measuring circuit MK according to FIG. 4 is now explained more fully with reference to the hysteresis diagram according to FIG. 5. At the beginning of the measuring interval, the control current generator IC is activated by a control pulse from the control logic SL and a magnetic bias current is impressed upon the magnetic circuit M in the measuring device MD. This circuit is assumed to be situated in a state $\Delta B=0$, $\Delta H=H1$.

At the premagnetization, the iron is brought to saturation by a mmf caused by the magnetic bias current, cf. curve 1. After that, the compensating process is initiated by the compensating current in the winding Lk, cf. curve 2, and the total circuit comprising the magnetic circuit M, the timing circuit TC, the amplifier OP, the switch circuit ST oscillates as has been described in the above-mentioned patent application, but in this case with a considerably higher frequency. When compensation has been attained at a value $\Delta H = \Delta Ho$, a hysteresis loop 3 is described which, however, is not transferred towards the value $\Delta B=0$, $\Delta H=0$. Instead, the loop 3 will describe an operation around the point with the H-value $\Delta Ho$ due to the inertia of the magnetic material and the high compensating frequency. Due to the magnetic bias, compensation occurs at every measuring instant from the same direction in the hysteresis diagram and the residual magnetization (the coercive force $\Delta Ho$) does not affect the comparison between the two measuring results, since the difference between these is formed, whereby the constant error ($\Delta Ho$) is eliminated. The dashed curve 4 in FIG. 5 shows the case where magnetic bias occurs from another value $\Delta H2$ (measuring instant 2) than the value $\Delta H1$ (measuring instant 1) above. The magnetic bias is in both cases so great that the iron is brought to saturation, and compensation occurs from the same direction from one measuring instant to another.

Figure 6:
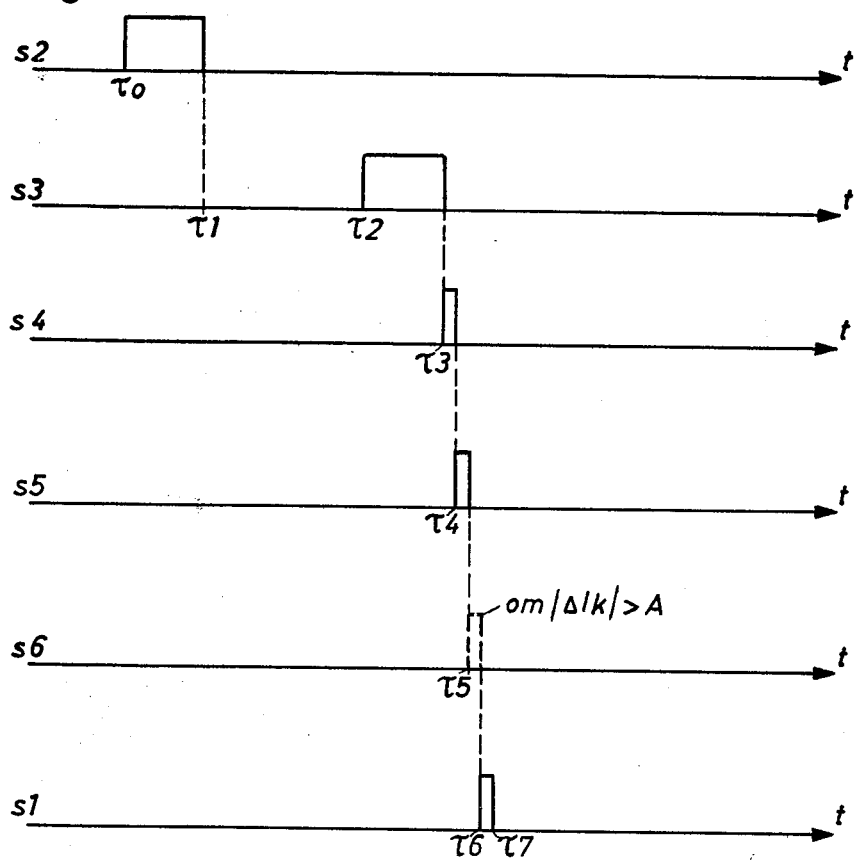
FIG. 6 shows a timing diagram for explaining the operation of the apparatus.

The mode of operation of the apparatus according to FIG. 3 will be described more closely with reference to the time diagram according to FIG. 6. At the time $\tau 0$, a pulse from the outlet s2 of the control logic SL is fed to the pulse generating circuit PK, i.e. to the controllable current generator IC. The pulse appears during the time interval $\tau 0 - \tau 1$. During this interval, a current is generated by the current generator IC through the magnetic bias winding Lf (FIG. 4). The time interval $\tau 0 - \tau 1$ is preferably selected in the order of 10 s, whereby the iron in the magnetic circuit M is safely brought to saturation. During the time interval $\tau 1 - \tau 2$, which is of the order of a few seconds, a transient state of the current measuring device circuits occurs, as has been described above, and the hysteresis process according to curve 3 in FIG. 5 is stabilized around a certain value $\Delta H0$. At the time $\tau 2$, measurement of the charging current is initiated and is continued until the time $\tau 3$, whereby an average value of the charging current during the interval $\tau 2 - \tau 3 (=30$ s$)$ is obtained by voltage detection across the resistor R6 and by the fact that the analog-digital converter is forming the voltage time integral across the interval $\tau 2 - \tau 3$.

The analog-digital converter AD is activated by a pulse from the outlet s3 of the control logic SL and conversion of the analog measuring value to digital form occurs accordingly during the interval $\tau 2 - \tau 3$. The first memory unit M1 is activated at the time $\tau 3$ by a short pulse across the outlet s4 of the control logic SL and the measuring value is stored in digital form in this memory. A reference value in digital form is assumed to be stored in the memory unit M2, e.g. the measuring value from the previous measuring instant.

At the time $\tau 4$, an activating pulse across the outlet s5 is delivered to the arithmetic unit AE and the values in the memory units M1 and M2 are fed to the unit AE, in which the difference between the measuring values, i.e. the quantity $\Delta Ik$ is formed according to the above-mentioned. The value $\Delta Ik$ is in the control logic SL compared with the constant value A or B (cf. FIG. 2) depending on the sign of $\Delta Ik$, confirming whether $/\Delta Ik/$ is greater than or less than A and B respectively. If $/\Delta Ik/ > A$ (cf. for instance the measuring points P1 and P2 in FIG. 2) a pulse (dashed) is delivered at the time $\tau 5$ across the outlet s6 to the memory unit M1 being simultaneously transmitted to the unit M2, where it is now forming a new reference value. On the other hand, if the quantity $/\Delta Ik/ < A$ (cf. the measuring points P6 and P7) no pulse is delivered across the outlet s6, since the stored value will henceforth remain as a reference value.

In the control logic SL there is a counting circuit and associated logic circuits, the counting circuit counting the number of consecutive measuring instants that for each one the condition $/\Delta Ik/ < A$ if $Ik < 0$ or $/\Delta Ik/ < 0$ is fulfilled. As mentioned above, it has, for example, been established that 10 such measuring instants will occur in consecutive order for a leveled-off charging current to be considered available. After having counted those 10 measuring instants, the control logic SL delivers a control pulse across the outlet s1 to the controllable rectifier RL in order to change the value of the battery voltage, e.g. from 2.35 V/cell to 2.22 V/cell in accordance whith what has been described above.

In the embodiment of the apparatus according to FIG. 3, it has been shown that the obtained measuring values are converted to digital form before storing and processing in the arithmetic circuit and in the control logic. It is obviously also possible to omit the conversion to digital form and, instead, treat the measuring values in analog form. The procedure according to the invention will in principle be the same.

We claim:

1. A method for charging and supervising a battery, the battery receiving a charging current from a controllable voltage source having an outlet voltage dependent on the value of a control quantity which assumes a first value for giving the initial charging and a second value for giving the maintenance charging of the battery, said method comprising the steps of measuring the charging current at a number of consecutive measuring instants, storing a first measuring value associated with a first measuring instant as a reference value, a second measuring value associated with a second measuring instant, generating the difference between said reference value and the second measuring value for obtaining a difference value, comparing said difference value with a constant positive value, replacing said first measuring value as the reference value by said second measuring only if the absolute value of said difference value is greater than said constant value, and making said second value a new reference value, and accumulating a given number of the measuring instants for which said absolute value is less than said constant value is valid for controlling the voltage source in order to change its outlet voltage from said first to said second value.

2. Apparatus for transmitting a control signal to a charging current for a battery wherein the source delivers initial charging current to the battery in response to a first level of a control signal and delivers maintenance charging current to the battery in response to a second level of a control signal, said apparatus comprising measuring means for measuring the charging current to the battery at a succession of instants in time, first storing means for storing as a reference value as first value associated with the amplitude of the charging current at a first of the instants, second storing means for storing a second value associated with the amplitude of the charging current a second and later of the instants, the contents of said second storing means being continuously replaced by the value generated at each successive instant of time, comparing means for comparing said stored values, means responsive to said comparing means for replacing the contents of said first storing means with the contents of said second storing means whenever the absolute value of the difference between the values stored in said first and second storing means is less than a predetermined value, counting means for counting the number of instants when said absolute value is less than said predetermined value, and means responsive to said counting means for transmitting said first level of said control signal to the source of charging current while the count accumulated by said counting means is less than a given value and for transmitting said second level of said control signal when said count exceeds said given value.

3. The apparatus of claim 2 wherein: said measuring means comprises a current measuring circuit means periodically activated for given time intervals for generating a digital value related to the amplitude of the charging current during the time interval; said first and second storing means are digital storage devices; and said comparing means comprises an arithmetic unit for forming the difference in the values stored in said storing means and a comparator means for comparing said difference in the values with a fixed constant value.

4. The apparatus of claim 3 wherein said current measuring circuit means comprises a magnetic circuit means surrounding the flow of charging current, said magnetic circuit means having an air gap, a Hall effect device in the gap; a compensating winding about said magnetic circuit means, a compensation current generating means having an input connected to the output of said Hall effect device and an output connected to said compensating winding for generating a compensating current for neutralizing the flux generated by the charging current in said magnetic circuit means, and a bias winding means for increasing the ampere turns in said magnetic circuit means.

5. The apparatus of claim 4 wherein said bias winding means comprises another winding about said magnetic circuit means and a controllably pulsed current source connected to said bias winding means.

* * * * *